(12) United States Patent
Muramatsu et al.

(10) Patent No.: US 12,210,222 B2
(45) Date of Patent: Jan. 28, 2025

(54) FRAME AND EYEWEAR

(71) Applicant: CARL ZEISS VISION INTERNATIONAL GMBH, Aalen (DE)

(72) Inventors: Akihiro Muramatsu, Marugame (JP); Ryuki Kan, Nagoya (JP); Takafumi Ohto, Nagoya (JP)

(73) Assignee: CARL ZEISS VISION INTERNATIONAL GMBH, Aalen (DE)

( * ) Notice: Subject to any disclaimer, the term of this patent is extended or adjusted under 35 U.S.C. 154(b) by 469 days.

(21) Appl. No.: 17/633,230

(22) PCT Filed: Aug. 6, 2020

(86) PCT No.: PCT/JP2020/030163
§ 371 (c)(1),
(2) Date: Feb. 7, 2022

(87) PCT Pub. No.: WO2021/029316
PCT Pub. Date: Feb. 18, 2021

(65) Prior Publication Data
US 2022/0357598 A1 Nov. 10, 2022

(30) Foreign Application Priority Data
Aug. 9, 2019 (JP) .................. 2019-147701

(51) Int. Cl.
*G02C 5/22* (2006.01)
*G02C 5/16* (2006.01)
*G02C 11/00* (2006.01)

(52) U.S. Cl.
CPC ............. *G02C 5/2254* (2013.01); *G02C 5/16* (2013.01); *G02C 11/10* (2013.01); *G02C 2200/22* (2013.01)

(58) Field of Classification Search
None
See application file for complete search history.

(56) References Cited

U.S. PATENT DOCUMENTS 3,160,735 A * 12/1964 Aufricht .................. H05B 3/00
351/158
4,037,946 A 7/1977 Blumenthal
(Continued)

FOREIGN PATENT DOCUMENTS

CN 109324423 A 2/2019
JP 56-087017 A 7/1981
(Continued)

OTHER PUBLICATIONS

International Search Report PCT/JP2020/030163 mailed Oct. 6, 2020.

*Primary Examiner* — Darryl J Collins
(74) *Attorney, Agent, or Firm* — Shih IP Law Group, PLLC.

(57) ABSTRACT

This frame comprises: a front piece; a temple piece; a connection part that is elastic and that connects the front piece and the temple piece; and wiring which electrically connects a front piece-side electrical element provided to the front piece and a temple piece-side electrical element provided to the temple piece, and a portion of which is routed through the space between the front piece and the connection part.

15 Claims, 10 Drawing Sheets

(56) References Cited

U.S. PATENT DOCUMENTS

| | | | |
|---|---|---|---|
| 4,408,843 A | 10/1983 | Bononi | |
| 6,168,341 B1 | 1/2001 | Chene | |
| 6,336,250 B1 | 1/2002 | Takeda | |
| 8,253,593 B2 * | 8/2012 | Jia | G08G 1/095 |
| | | | 340/815.45 |
| 9,366,882 B2 * | 6/2016 | Iurilli | G02C 11/10 |
| 11,409,130 B1 * | 8/2022 | Jeong | G02B 27/0176 |
| 11,474,376 B2 * | 10/2022 | Gui | H01Q 1/273 |
| 2012/0002159 A1 | 1/2012 | Blum et al. | |
| 2014/0028966 A1 | 1/2014 | Blum | |

FOREIGN PATENT DOCUMENTS

| | | |
|---|---|---|
| JP | 2000-147438 A | 5/2000 |
| JP | 3121784 U | 6/2006 |
| JP | 2014-038202 A | 2/2014 |
| JP | 3189045 U | 2/2014 |
| JP | 2015-522842 A | 8/2015 |
| JP | 2018-189779 A | 11/2018 |

\* cited by examiner

FRAME AND EYEWEAR

TECHNICAL FIELD

The present invention relates to a frame and eyewear.

BACKGROUND ART

In the related art, eyewear equipped with a lens that has an electrical element driven by the application of a drive voltage, such as a liquid crystal lens with a changeable refractive index, has been developed (see PTL 1).

Such eyewear has a lens, a front that holds the lens, and temples. The temples are connected to the front by hinges or other connections, and can be turned with respect to the front.

CITATION LIST

Patent Literature

PTL 1
Japanese Unexamined Patent Application Publication (Translation of PCT Application) No. 2015-522842

SUMMARY OF INVENTION

Technical Problem

In the case of the above-described eyewear, the temples are disposed along the side of the user's head when the user wears the eyewear (hereinafter referred to as the "wearing state"), if the pressure from the temples is strong in the wearing state, the user may feel the eyewear uncomfortable to wear.

An object of the present invention is to provide a frame and eyewear that are comfortable to wear.

Solution to Problem

A frame according to an aspect of the present invention includes: a front; a temple; a connecting part having elasticity and configured to connect the front and the temple; and a wiring configured to electrically connect a front electric element provided in the front and a temple electric element provided in the temple, wherein a part of the wiring is arranged in a space between the front and the connecting part.

Eyewear according to an aspect of the present invention includes: the above-mentioned frame; and a lens held at the front.

Advantageous Effects of Invention

According to the present invention, it is possible to achieve a frame and eyewear that are comfortable to wear.

DESCRIPTION OF EMBODIMENTS

An example of an embodiment according to the present invention is described in detail below with reference to the drawings. Note that the frame and the eyewear according to the embodiment described below are examples of the frame and the eyewear according to the present invention, and the present invention is not limited to the embodiment described below.

Embodiment

Figure 1:
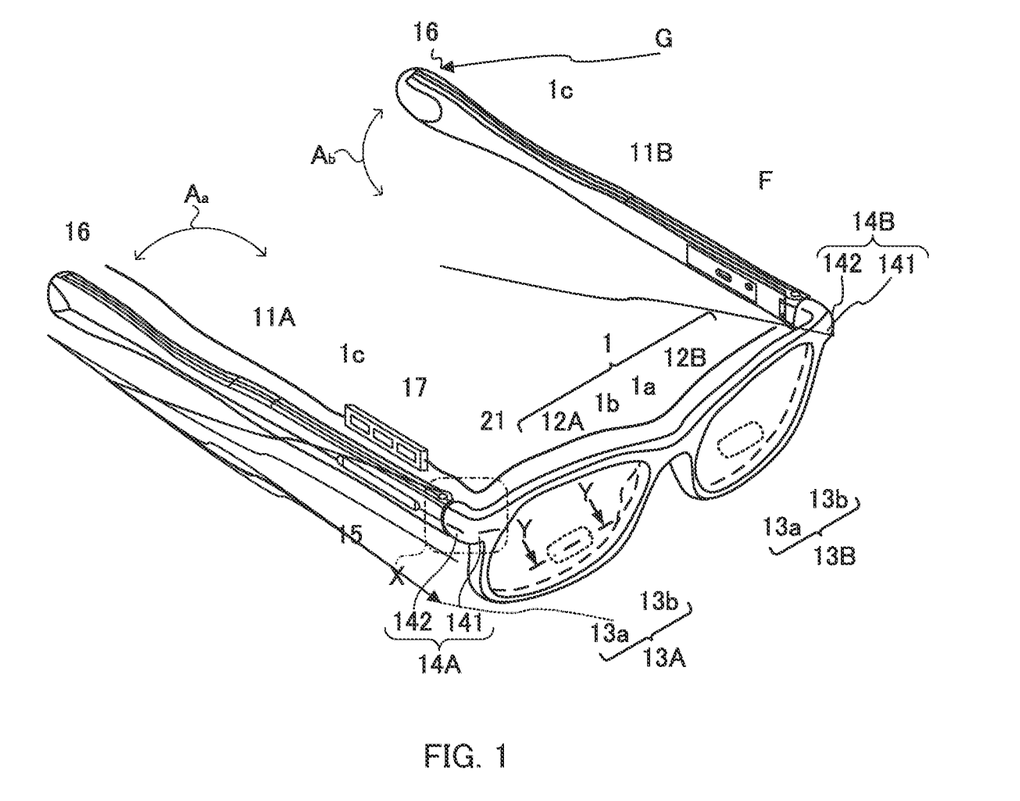
FIG. 1 is a perspective view of eyewear.

A frame and eyewear according to the present embodiment are described below with reference to FIGS. 1 to 13. FIG. 1 illustrates electronic eyeglasses G as an example of eyewear.

Electronic Eyeglasses

Electronic eyeglasses G includes frame F, a pair of lenses 13A and 13B, operation input part 15, power source 16, control part 17 and the like. Note that in the following description, a portion where front 1 of frame F (described below) is disposed is a front (forward) side of electronic eyeglasses G. In addition, in the following description, unless otherwise noted, the left-right direction is the left-right direction of the user wearing the eyewear.

The user (wearer) of electronic eyeglasses B switches the optical characteristics (such as power and light transmittance) of characteristic change part 131 in first region 13a of lenses 13A and 13B by operating (e.g., touching) operation input part 15 of frame F. Characteristic change part 131 corresponds to an example of an optical characteristic change part.

When operation input part 15 is operated by the user, control part 17 switches between a state where a voltage is applied to characteristic change part 131 (hereinafter referred to as "ON state"), and a state where a voltage is not applied (hereinafter referred to as "OFF state") on the basis of the operation. The ON state of characteristic change part 131 is also the ON state of electronic eyeglasses G. In addition, the OFF state of characteristic change part 131 is also the OFF state electronic eyeglasses G.

Frame

As illustrated in FIG. 1, frame F includes front 1, a pair of temples 11A and 11B, and connecting part 3. In addition, frame F may include cover part 4. Note that in FIG. 1, connecting part 3 and cover part 4, which are features of frame F according to the present embodiment, are not illustrated. It should be noted that, electronic eyeglasses G illustrated in FIG. 1 may be interpreted to include connecting part 3 and cover part 4. The structures of connecting part 3 and cover part 4 are described later with reference to FIGS. 3 to 13.

Front

Front 1 includes a pair of rims 12A and 12B, bridge 1a, and a pair of end pieces 14A and 14B. Front 1 is made of metal or non-metal (e.g., synthetic resin). Front 1 may be partially made of metal, with the remaining part made of a non-metal material.

In the case where front 1 is made of metal, examples of the metal material that makes up front 1 include titanium, aluminum, stainless-steel, gold, and alloys thereof. Front 1 made of metal gives a sharp and serious impression. In addition, front 1 made of metal can also give an impression of luxury and elegance. In addition, front 1 made of metal contributes to the improvement of the durability of frame F, and in turn, electronic eyeglasses G.

Front 1 is made of a non-metal material, examples of the non-metal material that makes up front 1 include resins such as polyimide, acetate, celluloid, polyetherimide and polyurethane, and carbon. Front 1 made of a non-metal material gives a gentle and soft impression. In addition, front 1 made of a non-metal material is easy to process, and therefore contributes to the reduction of manufacturing cost of frame F, and in turn, electronic eyeglasses G.

The pair of rims 12A and 12B support the pair of lenses 13A and 13B, respectively. Rims 12A and 12B have shapes that match the shapes of lenses 13A and 13B, respectively.

Bridge 1a connects rims 12A and 12B in the width direction. Bridge 1a includes a pair of nose pads 1b that makes contact with the user's nose.

The pair of end pieces 14A and 14B are provided in rims 12A and 12B, respectively. End piece 14A includes first end piece 141 extended to the right side from the right end portion of rim 12A, and second end piece 142 extended to the rear side from the right end portion of first end piece 141.

End piece 14B includes first end piece 141 extended to the left side from the left end portion of rim 12B, and second end piece 142 extended to the rear side from the left end portion of first end piece 141.

Wiring 21 for electrically connecting first electrode 131b and second electrode 131d of lenses 13A and 13B (see FIG. 2) and control part 17 is arranged inside (e.g., a concave groove formed in the inner peripheral surface) front 1.

Note that first electrode 131b and second electrode 131d and a conduction part (not illustrated in the drawing) of wiring 21 are connected to each other through a conductive member such as conductive rubber (not illustrated in the drawing).

Temples

The pair of temples 11A and 11B are substantially bilaterally symmetric in electronic eyeglasses G, and have the same components. Temple 11A is a right-ear temple, and temple 11B is a left-ear temple.

Each of temples 11A and 11B includes housing 1c. The front end portions of temples 11A and 11B are connected to front 1 through connecting part 3 (described below). In the present embodiment, temples 11A and 11B rotate in the directions of arrows Aa and Ab in FIG. 1 with respect to front 1. Note that among the components of front 1, connecting part 3 and cover part 4 are described later.

Lenses

Figure 2:
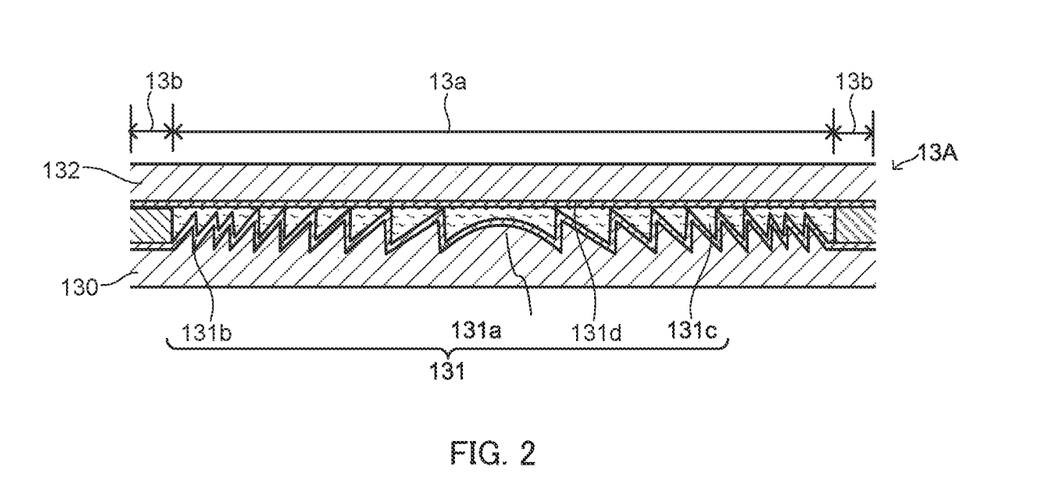
FIG. 2 is a sectional view of a lens.
Figure 3:
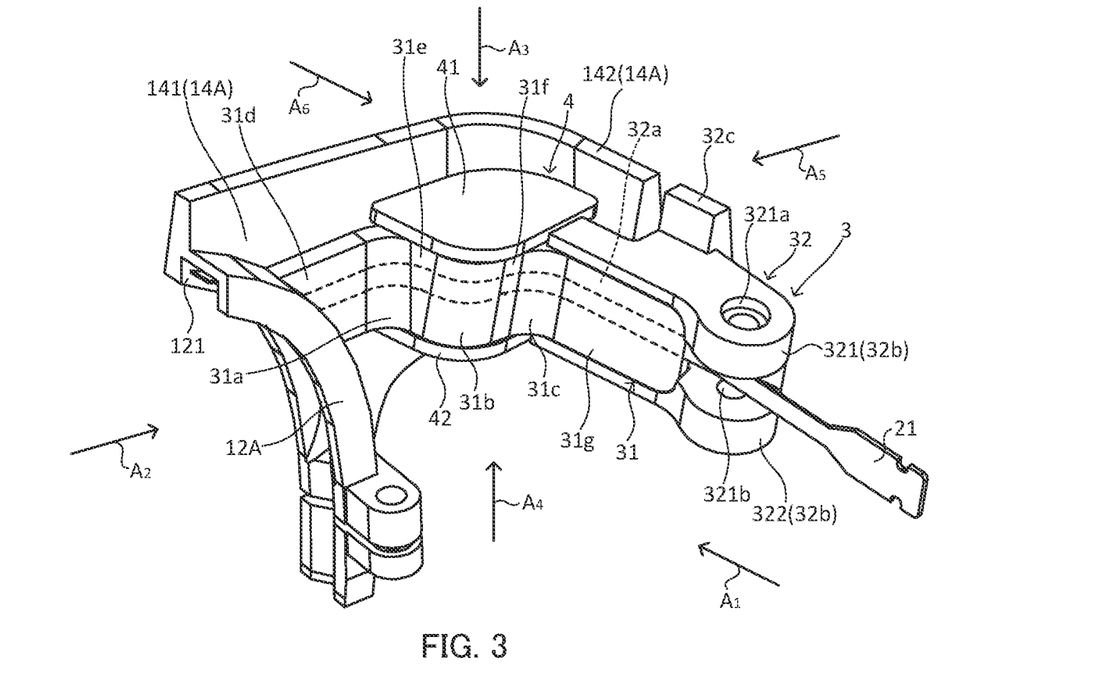
FIG. 3 is a diagram for describing a connecting part of the eyewear according to an embodiment, and is a perspective view of a portion corresponds to a part X in FIG. 1.
Figure 4:
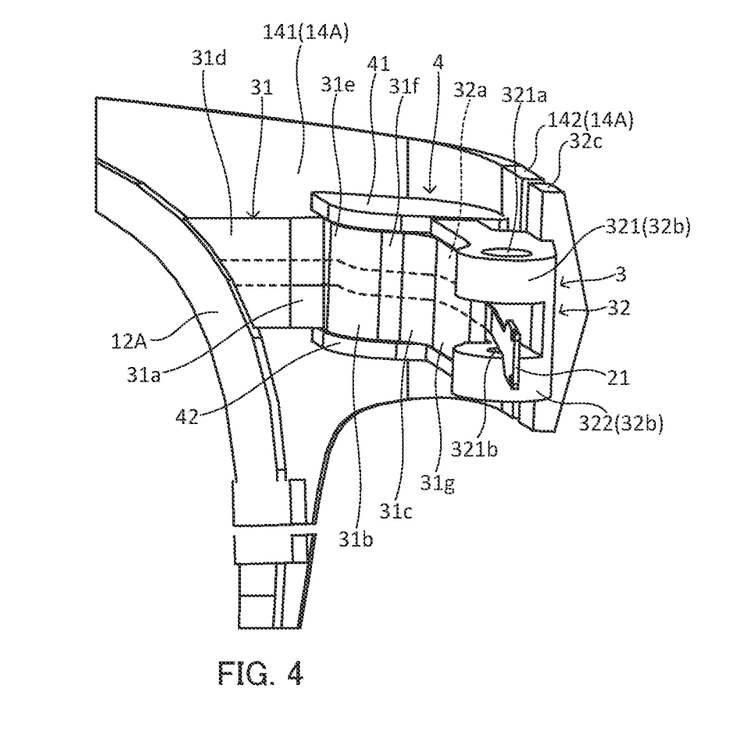
FIG. 4 is a diagram as viewed in arrow A1 of FIG. 3.
Figure 5:
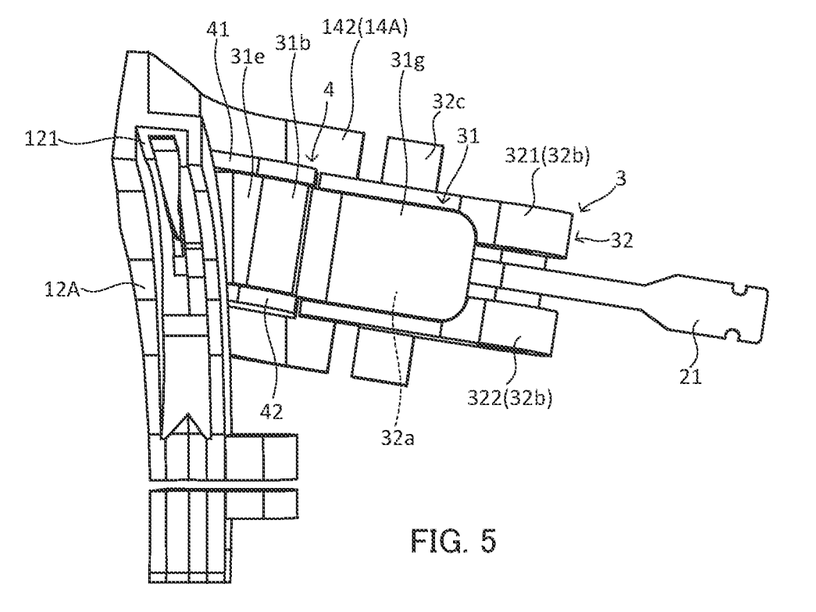
FIG. 5 is a diagram as viewed in arrow A2 of FIG. 3.
Figure 6:
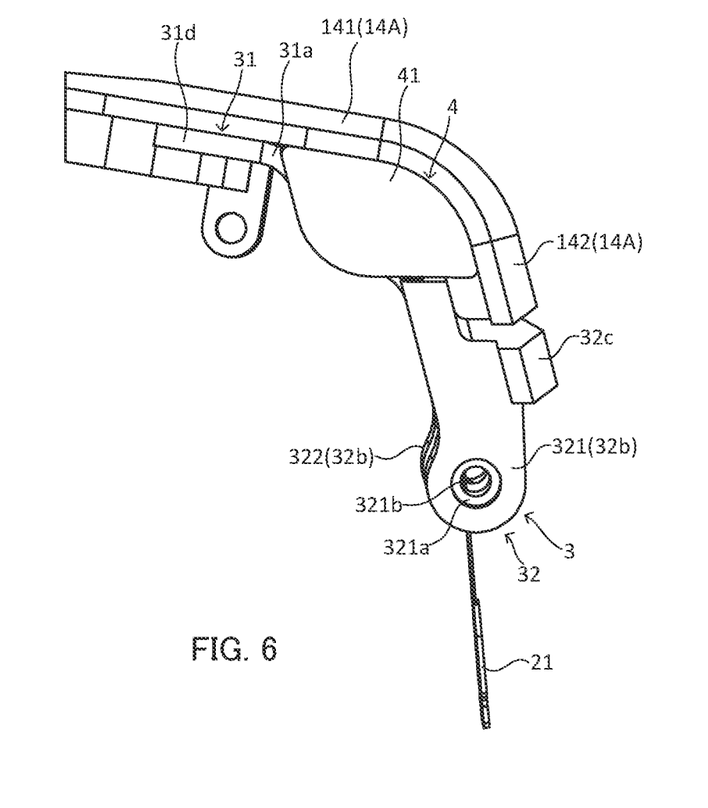
FIG. 6 is a diagram as viewed in arrow A3 of FIG. 3.
Figure 7:
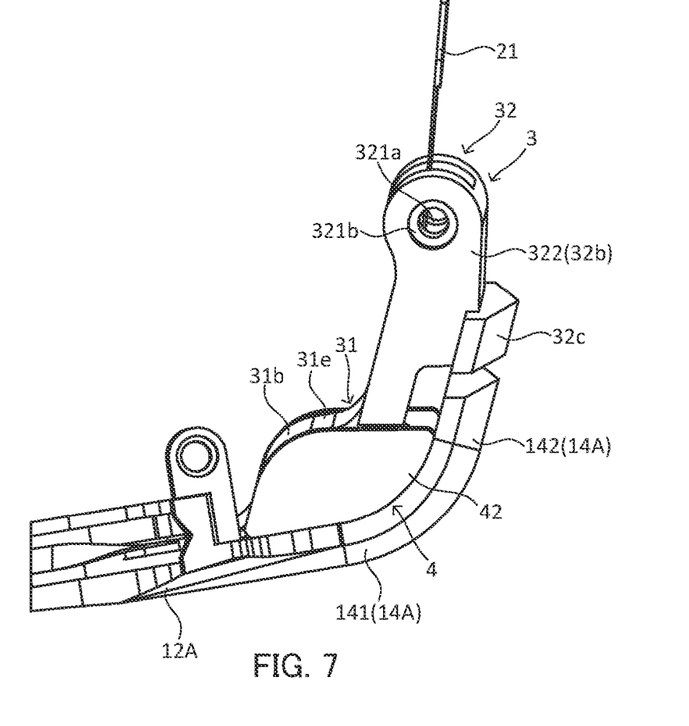
FIG. 7 is a diagram as viewed in arrow A4 of FIG. 3.
Figure 8:
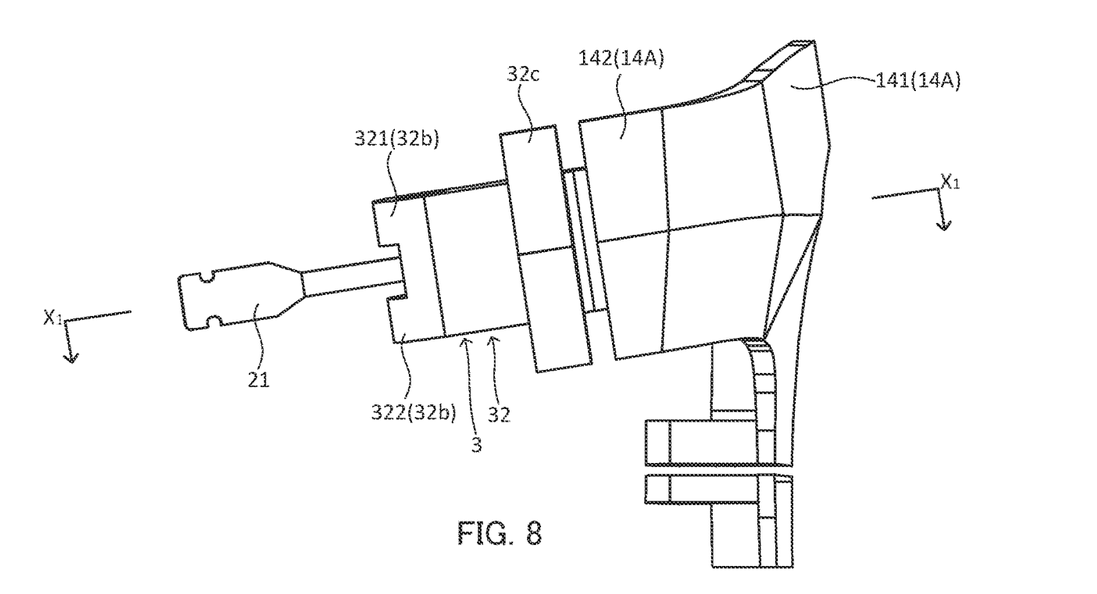
FIG. 8 is a diagram as viewed in arrow A5 of FIG. 3.
Figure 9:
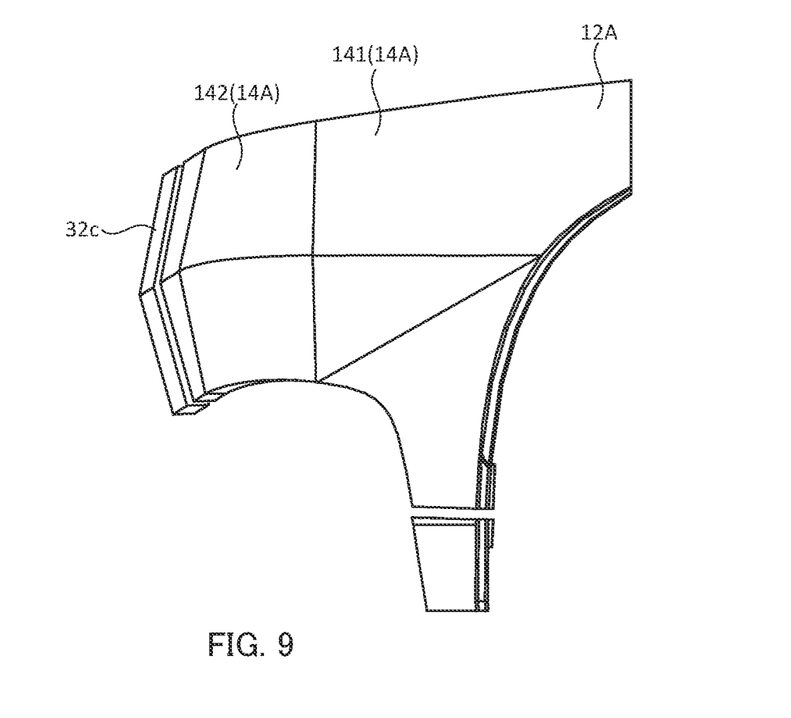
FIG. 9 is a diagram as viewed in arrow A6 of FIG. 3.

Next, the configurations of the pair of lenses 13A and 13B are described below with reference to FIG. 2. FIG. 2 is a sectional view taken along line Y-Y of FIG. 1, and is a schematic cross-sectional view illustrating an exemplary configuration of the pair of lenses 13A and 13B. Lens 13A is a right-eye lens, and lens 13B is a left-eye lens. Each of lenses 13A and 13B corresponds to an example of a front electric element.

The front electric element may be various electric elements supported by front F. More specifically, the front electric element may be a display device (display), or a laser irradiation device that emits a laser for directly drawing an image at the user's retina.

Right-eye lens 13A is described below. For left eye lens 13B, the following description for right-eye lens 13A can be read accordingly.

Lens 13A includes first region 13a whose power can be switched by voltage, and second region 13b provided in the region other than first region 13a. First region 13a is an example of an electric active region.

First Region

First region 13a includes first substrate 130, characteristic change part 131, second substrate 132 and the like in this order from the rear side (the lower side in FIG. 2).

When characteristic change part 131 is in an OFF state, the power of first region 13a is substantially equal to the power of second region 13b. On the other hand, when characteristic change part 131 is in an ON state, the power of first region 13a is different from the power of second region 13b.

Characteristic Change Part

Characteristic change part 131 includes diffraction structure 131a, first electrode 131b, liquid crystal module 131c, second electrode 131d and the like in this order from the rear side.

Characteristic change part 131 has a predetermined refractive index in an ON state where a voltage is applied to liquid crystal module 131c. Note that the optical characteristics of characteristic change part 131 that change based on voltage application are not limited to the refractive index. In the case where the lens is an electrochromic lens, the optical characteristics of characteristic change part 131 that change based on voltage application is light transmittance.

Operation Input Part

Operation input part 15 (see FIG. 1) is held by housing 1c. Operation input part 15 includes a capacitive detection pad (not illustrated in the drawing) for example. The detection pad may be a publicly known detection pad that can be used as a touch sensor. When the user's finger touches operation input part 15, operation input part 15 detects a change in the capacitance that is caused by the contact.

Power Source

Power source 16 (see FIG. 1) supplies power to an electronic components that make up electronic eyeglasses G. Examples of the electronic components include operation input part 15 and control part 17. In the present embodiment, power source 16 is a charging type battery pack detachably held at the other end portion (rear end portion) of temples 11A and 11B.

Control Part

Control part 17 (see FIG. 1) is provided in housing 1c of each of temples 11A and 11B. In FIG. 1, control part 17 provided in temple 11B is omitted. Through wiring 21, control part 17 is electrically connected to the detection pad of operation input part 15, first electrode 131b, and second electrode 131d.

Control part 17 controls the operation of the electronic component of electronic eyeglasses G. Note that operation input part 15, power source 16, and control part 17 may be provided in only one of temples 11A and 11B. Control part 17 corresponds to an example of a temple electric element.

Connecting Part

Next, connecting part 3 is described with reference to FIGS. 3 to 13. Connecting part 3 has elasticity, and connects between temples 11A and 11B and front 1. Connecting part 3 is provided for each of temples 11A and 11B.

Connecting part 3 (also referred to as first connecting part) that connects between right-ear temple 11A and front 1, and connecting part 3 (also referred to as second connecting part) that connects between left-ear temple 11B and front 1 have bilaterally symmetric structures. As such, a structure of the first connecting part is described below. For the second connecting part, the following description for the first connecting part can be read accordingly.

Connecting part 3 includes resilient part 31 and hinge part 32. Connecting part 3 connects between the right end portion of rim 12A and the front end portion of temple 11A.

Resilient Part

Resilient part 31 is, for example, a plate member (e.g., a leaf spring) or a wire made of metal or a non-metal material (e.g., synthetic resin) with elasticity. Resilient part 31 is disposed along the inner surface of end piece 14A.

Examples of the metal material of resilient part 31 include titanium, aluminum, stainless-steel, gold, and alloys thereof. In the case where front 1 is made of metal and resilient part 31 is also made of metal, a sense of unity in the design of front 1 and resilient part 31 can be given. In the case where front 1 is made of a non-metal material and resilient part 31 is made of metal, a unique impression can be given. In addition, resilient part 31 made of metal contributes to the improvement of the durability of frame F, and in turn, electronic eyeglasses G.

In the case where resilient part 31 is made of a non-metal material, examples of the non-metal material that makes up resilient part 31 include resins such as polyamide, acetate, celluloid, polyetherimide and polyurethane, and carbon. In the case where front 1 is made of a non-metal material, and resilient part 31 is also made of a non-metal material, a sense of unity in the design of front 1 and resilient part 31 can be given. In the case where front 1 is made of metal and resilient part 31 is made of a non-metal material, a unique impression can be given. In addition, non-metal resilient part 31 is easy to process, and therefore frame F, and in turn, electronic eyeglasses G, contributes to the reduction of manufacturing cost.

Resilient part 31 includes a first fixing part (a part corresponding to first plate part 31d described later) fixed to front 1, and an elastic deformation part (a part corresponding to second plate part 31e, third plate part 31f, and fourth plate part 31g described later) connected to the first fixing part. The elastic deformation part elastically deforms in accordance with a force applied to temple 11A so as to change angle θ between the elastic deformation part and the first fixing part (see FIGS. 12 and 13).

More specifically, resilient part 31 includes a plurality of (in the present embodiment, three) bending parts (parts corresponding to first bending part 31a, second bending part 31b, and third bending part 31c described later), and a plurality of (in the present embodiment, four) elements (parts corresponding to first plate part 31d, second plate part 31e, third plate part 31f, and fourth plate part 31g described later).

In the present embodiment, resilient part 31 includes first bending part 31a, second bending part 31b, and third bending part 31c. In addition, resilient part 31 includes first plate part 31d, second plate part 31e, third plate part 31f, and fourth plate part 31g.

First plate part 31d and second plate part 31e are connected to each other through first bending part 31a. In addition, second plate part 31e and third plate part 31f are connected to each other through second bending part 31b. In addition, third plate part 31f and fourth plate part 31g are connected to each other through third bending part 31c.

Figure 10:
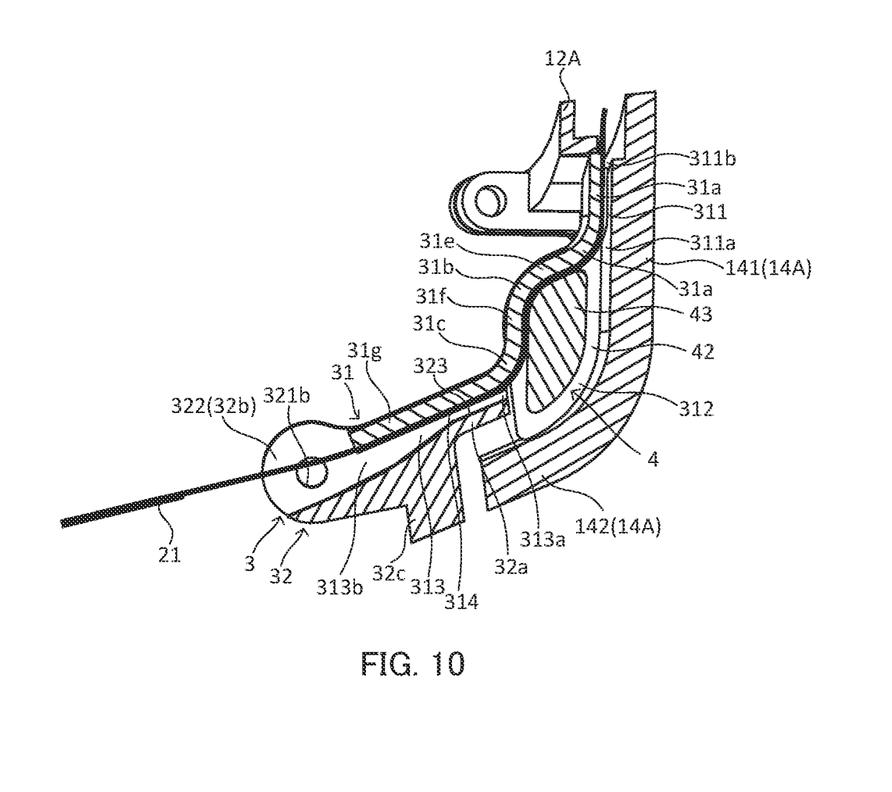
FIG. 10 is a sectional view taken along X1-X1 of FIG. 8.
Figure 11:
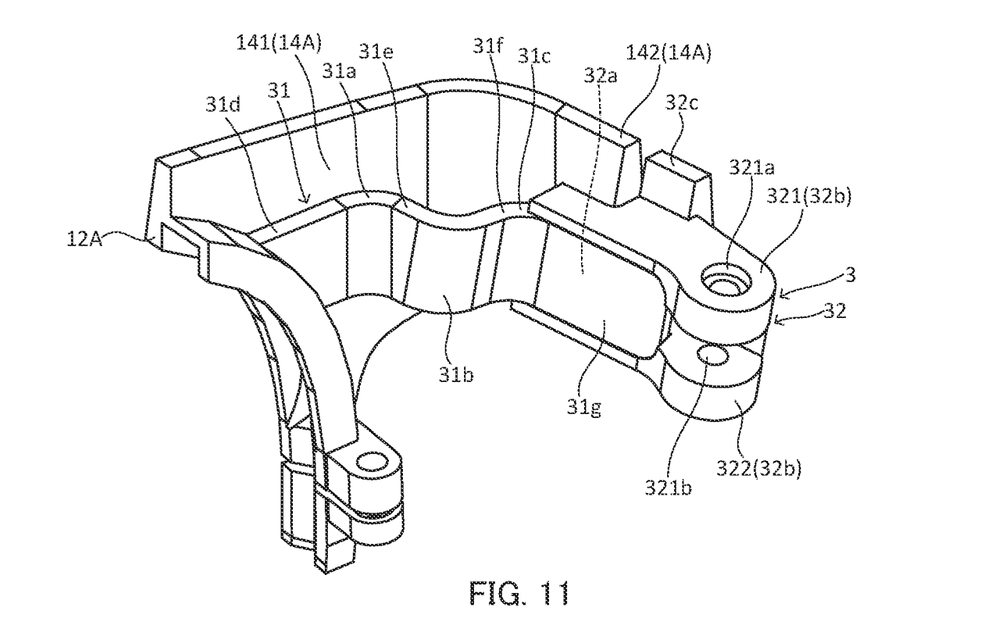
FIG. 11 is a perspective view of a portion corresponding to part X in FIG. 1, in which a cover part and a wiring are omitted.
Figure 12:
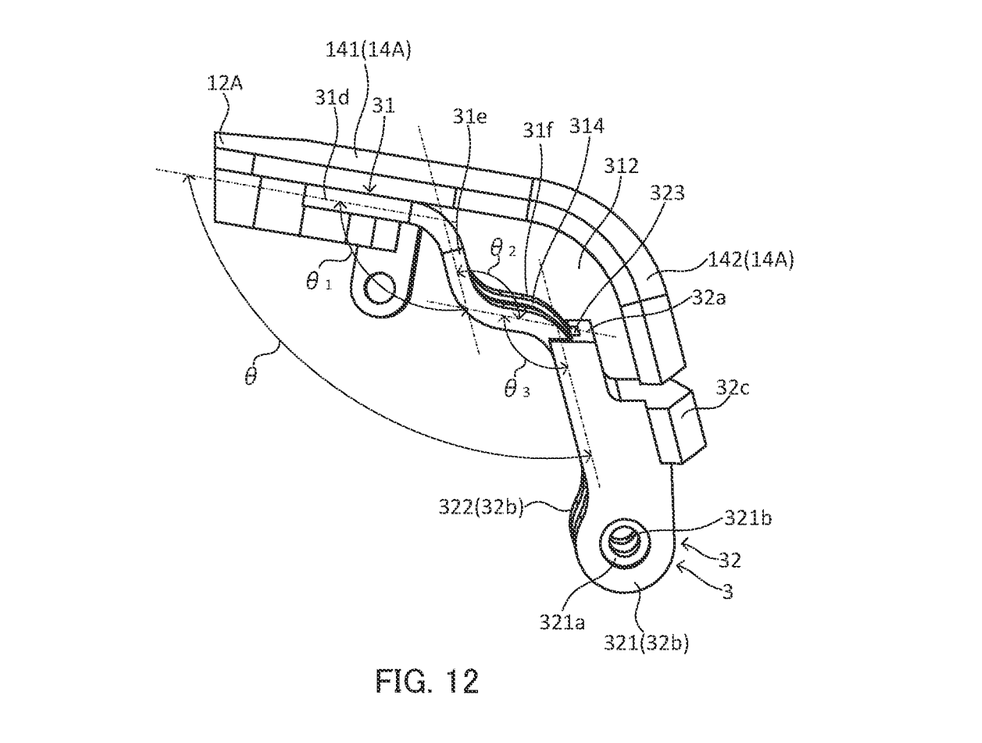
FIG. 12 is a diagram as viewed in arrow A3 of FIG. 3, in which the cover pant and the wiring are omitted.

In addition, resilient part 31 includes groove part 314 over the entire length in the side surface facing end piece 14A (see FIGS. 10 and 12). In other words, each of first plate part 31d, second plate part 31e, third plate part 31f, and fourth plate part 31g includes groove part 314 in the side surface facing end piece 14A.

First plate part 31d has a rectangular plate-shape extending in the width direction of frame F, along the rear side surface of first end piece 141 (hereinafter referred to as "end piece side fixing part"). Note that the extending direction of first plate part 31d may be tilted to the width direction of frame F by a predetermined angle.

In the present embodiment, first plate part 31d is fixed to the end piece side fixing part by welding. First arrangement space 311 (see FIG. 10) for arranging wiring 21 is provided between first plate part 31d and the end piece side fixing part.

In the present embodiment, first arrangement space 311 is provided in a part surrounded by groove part 314 formed in first plate part 31d and the end piece side fixing part. Note that the end piece side fixing part may include a groove part extending in the width direction of frame F at a part facing groove part 314.

First arrangement space 311 includes first opening 311a provided at a first end portion (right end portion) in the width direction of frame F (see FIG. 10), and second opening 311b provided at a second end portion (left end portion) in the width direction of frame F (see FIG. 10).

The first end portion of first arrangement space 311 is connected to second arrangement space 312 (described below). The second end portion of first arrangement space 311 is connected to rim side arrangement space 121 (see FIG. 3) provided at rim 12A. The portion of in first arrangement space 311 other than the first end portion and the second end portion is surrounded by first plate part 31d and the end piece side fixing part.

Note that the method of fixing first plate part 31d to the end piece side fixing part is not limited to the fixing method of the present embodiment. For example, first plate part 31d may be fixed to the end piece side fixing part through a fastening member (e.g., bolts or screws). The shape of first plate part 31d is not limited to the present embodiment.

Second plate part 31e has a rectangular plate-shape extending in the front-rear direction, and extends from the first end portion (right end portion) of first plate part 31d to the rear side. The extending direction of second plate part 31e may be tilted to the front-rear direction by a predetermined angle. Second plate part 31e faces the inner surface of second end piece 142 with a predetermined gap therebetween.

Second plate part 31e is connected to the first end portion of first plate part 31d through first bending part 31a. The angle between second plate part 31e and first plate part 31d is θ1 (see FIG. 12). Preferably, the angle θ1 between second plate part 31e and first plate part 31d is 115°±3°.

Third plate part 31f has a rectangular plate-shape, and extends from the first end portion (rear end portion) of second plate part 31e to one side (right side) in the width direction of frame F. Third plate part 311 faces the rear side surface of first end piece 141 with a predetermined gap therebetween. Note that the extending direction of third plate part 31f may be tilted to the width direction of frame F by a predetermined angle.

Third plate part 31f is connected to the first end portion of second plate part 31e through second bending part 31b. The angle between third plate part 31f and second plate part 31e is θ2 (see FIG. 12). Preferably, angle θ2 between third plate part 31f and second plate part 31e is 114°±3°. In the present embodiment, third plate part 31f and first plate part 31d are parallel to each other.

In the present embodiment, second arrangement space 312 for arranging a part of wiring 21 is provided between second plate part 31e and third plate, part 31f, and end piece 14A. The first end portion (upper end portion) and the second end portion (lower end portion) of second arrangement space 312 in the vertical direction are open.

Fourth plate part 31g has a rectangular plate-shape, and extends from the first end portion(right end portion) of third plate part 31f to the rear side. Fourth plate part 31g is connected to the first end portion of third plate part 31f through third bending part 31c. The angle between fourth plate part 31g and third plate part 31f is θ3. Preferably, angle θ3 between fourth plate part 31g and third plate part 31f is 114°±3°. Note that the extending direction of fourth plate part 31g may be tilted to the front-rear direction by a predetermined angle.

In the present embodiment, fourth plate part 31g and second plate part 31e are parallel to each other. Accordingly, angle θ between fourth plate part 31g and first plate part 31d is equal to angle θ1 between second plate part 31e and first plate part 31d (θ=θ1). In addition, angle θ between fourth plate part 31g and first plate part 31d is equal to angle θ3 between fourth plate part 31g and third plate part 31f(θ=θ3), or is slightly different from angle θ3 (e.g., ±3°). Note that preferably, angle θ between fourth plate part 31g and first plate part 31d is 115°±3°.

In the present embodiment, fourth plate part 31g is fixed to first supporting part 32a (described below) of hinge part 32 by welding. Third arrangement space 313 (see FIG. 10) for disposing wiring 21 is provided between fourth plate part 31g and first supporting part 32a.

In the present embodiment, third arrangement space 313 is provided in a portion surrounded by groove part 314 formed in fourth plate part 31g and groove part 323 (see FIGS. 10 and 12) of first supporting part 32a.

Third arrangement space 313 includes first opening 313a (see FIG. 10) provided at a first end portion (front end portion) in the front-rear direction of frame F, and second opening 313b (see FIG. 10) provided at a second end portion (rear end portion) in the front-rear direction of frame F.

The first end portion of third arrangement space 313 is connected to second arrangement space 312. The second end portion of third arrangement space 313 is connected to a space between connecting part 3 and temple 11A. The portion of third arrangement space 313 other than the first end portion and the second end portion is surrounded by fourth plate part 31g and first supporting part 32a.

Note that the method of fixing fourth plate part 31g to first supporting part 32a is not limited to the fixing method of the present embodiment. For example, fourth plate part 31g may be fixed to first supporting part 32a through a fastening member (e.g., bolts or screws). The shape of fourth plate part 31g is not limited to the present embodiment.

Resilient part 31 having the above-mentioned configuration is elastically-deformable so as to change angle θ between fourth plate part 31g and first plate part 31d. Along with elastic deformation of resilient part 31, temple 11A turns in the direction of arrow Ac of FIG. 13 with respect to rim 12A.

Note that the structure of the resilient part is not limited to the structure of resilient part 31 described above. The number of the bending parts provided in the resilient part, and the number of the elements connected by the bending parts may be appropriately set in consideration of the elastic modulus of the resilient part and the like.

Hinge Part

Hinge part 32 includes first supporting part 32a, second supporting part 32b, and exterior decorative part 32c. The material of hinge part 32 may be metal or synthetic resin.

Examples of the metal material that makes up hinge part 32 include titanium, aluminum, stainless-steel, gold, and alloys thereof. In the case where resilient part 31 is made of metal and hinge part 32 is also made of metal, a sense of unity in the design of connecting part 3 can be given. In the case where resilient part 31 is made of a non-metal material and hinge part 32 is made of metal, a unique impression can be given.

Examples of the non-metal material that makes up hinge part 32 include resins such as polyamide, acetate, celluloid, polyetherimide and polyurethane, and carbon. In the case where resilient part 31 is made of a non-metal material and hinge part 32 is also made of a non-metal material, a sense of unity in the design of connecting part 3 can be given. In the case where resilient part 31 is made of metal and hinge part 32 is made of a non-metal material, a unique impression can be given.

First supporting part 32a has a rectangular plate-shape extending in the front-rear direction, and supports fourth plate part 31g of resilient part 31. First supporting part 32a includes groove part 323 (see FIGS. 10 and 12) extending in the front-rear direction at a part facing groove part 314 of fourth plate part 31g.

Second supporting part 32b is provided at a rear end portion of first supporting part 32a, and supports the front end portion of temple 11A. More specifically, second supporting part 32b includes a pair of opposing plate parts 321 and 322.

The pair of opposing plate parts 321 and 322 include through holes 321a and 321b, respectively, extending in the vertical direction. The central axis of through hole 321a and the central axis of through hole 321b coincide with each other.

Second supporting part 32b turnably supports the front end portion of temple 11A through pins 111 (see FIG. 13) inserted, from top or bottom, to holes 321a and 321b.

Exterior decorative part 32c is provided in the right side surface of first supporting part 32a. The outer surface (right side surface) of exterior decorative part 32c has a shape corresponding to the outer surface (right side surface) of end piece 14A. More specifically, the outer surface of exterior decorative part 32c includes a ridgeline protruding most rightward at a center portion in the vertical direction.

In addition, a gap is provided between the rear end portion of end piece 14A and exterior decorative part 32c. Exterior decorative part 32c contributes to the improvement of the design of frame F in the side view.

In the present embodiment, hinge part 32 and resilient part 31 are composed of different members. Hinge part 32 is fixed to resilient part 31 by a fixing means such as welding and bonding. It should be noted that, hinge part 32 and resilient part 31 may be composed of one component.

Cover Part

Figure 14:
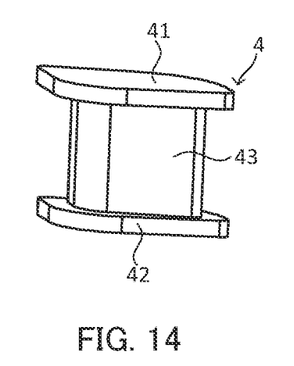
FIG. 14 is a perspective view of the cover part.
Figure 15:
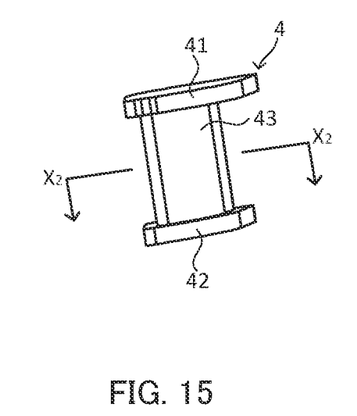
FIG. 15 is a perspective view of the cover part as viewed in an angle different from that of FIG. 14.
Figure 16:
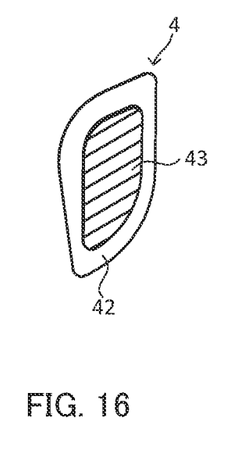
FIG. 16 is a sectional taken along X2-X2 of FIG. 15.

As illustrated in FIGS. 14 to 16, cover part 4 includes first cover part 41, second cover part 42, and coupling part 43. The material of cover part 4 is, for example, an elastically-deformable material (such as silicone rubber). Preferably, the material of that makes up cover part 4 is a material with a durometer hardness of A30 to A50, more preferably a material with a durometer hardness of A35 to A45.

First cover part 41 has a plate shape, and covers the upper end portion (upper opening) of second arrangement space 312 from above. The area of first cover part 41 (see FIG. 6) is larger than the area of the upper opening (see FIG. 12) of second arrangement space 312.

Second cover part 42 has a plate shape, and covers the lower end portion (lower opening) of second arrangement space 312 from below. The area (see FIG. 6) of second cover part 42 is larger than the area of the lower opening (see FIG. 12) of second arrangement space 312.

Coupling part 43 has a solid or hollow columnar shape, and connects first cover part 41 and second cover part 42 in the vertical direction. In the assembled state, coupling part 43 is disposed in second arrangement space 312.

In the present embodiment, wiring 21 arranged in second arrangement space 312 is arranged to avoid coupling part 43 in second arrangement space 312.

Modification 1 of Cover Part

Figure 17A:
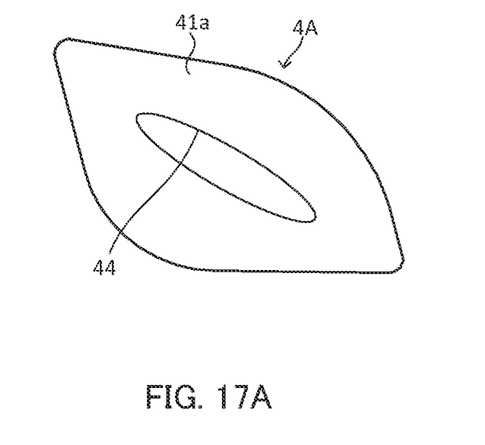
FIG. 17A is a plan view of a cover part according to Modification 1.
Figure 17B:
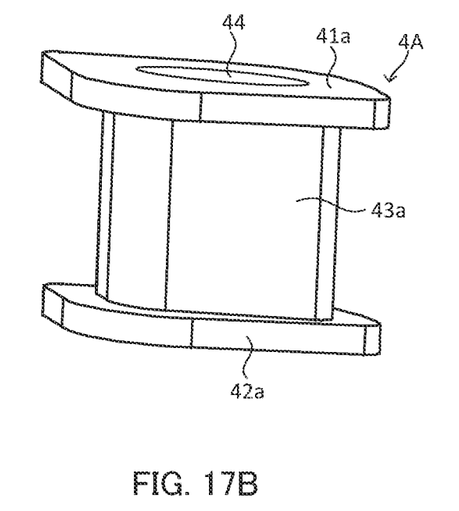
FIG. 17B is a perspective view of the cover part according to Modification 1.

FIGS. 17A and 17B are diagrams for describing cover part 4A according to Modification 1. As with the above-described cover part 4, cover part 4A includes first cover part 41a, second cover part 42a, and coupling part 43a.

In addition, cover part 4A includes through hole 44 extending through cover part 4A in the vertical direction. The first end portion (upper end portion) of through hole 44 is open at the top surface of first cover part 41. In addition, through hole 44 extends through coupling part 43a in the vertical direction. In addition, the second end portion (lower end portion) of through hole 44 is open at the bottom surface of second cover part 42a. Through hole 44 is an example of a hollow part.

Through hole 44 can reduce the elastic modulus of cover part 4A. When the elastic modulus of cover part 4A is reduced, the worker can more easily cause the elastic deformation of cover part 4A in the operation of mounting cover part 4A to second arrangement space 312.

Note that the elastic modulus of cover part 4A can be adjusted to a desired value by adjusting the size of through hole 44. In addition, through hole 44 extends through cover part 4A in the vertical direction through coupling part 43a, and therefore foreign matters do not enter second arrangement space 312 from through hole 44.

Modification 2 of Cover Part

Figure 18:
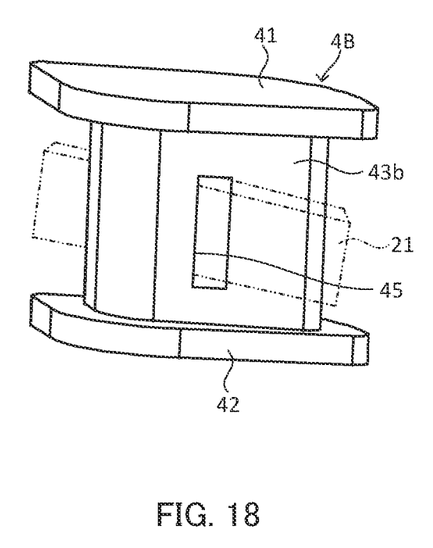
FIG. 18 is a perspective view of a cover part according to Modification 2.

FIG. 18 is a diagram for describing cover part 4B according to Modification 2. As with the above-described cover part 4, cover part 4B includes first cover part 41, second cover part 42, and coupling part 43b.

In addition, cover part 4B includes through hole 45 extending through coupling part 43b in the front-rear direction. Through hole 45 is an example of a hollow part. Wiring 21 is inserted in through hole 45. Cover part 4B can achieve positioning of wiring 21, and prevent damage to wiring 21.

Modification 3 of Cover Part

Figure 19:
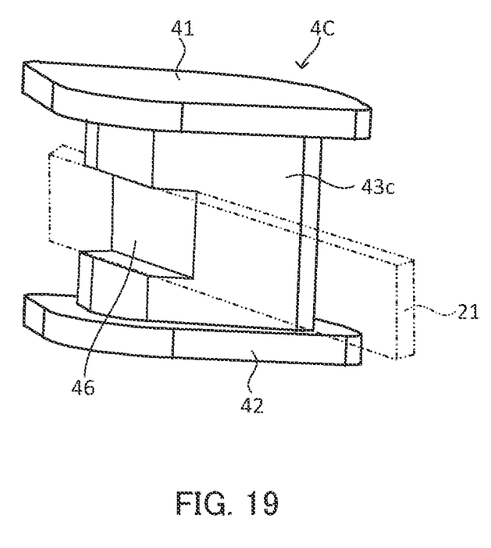
FIG. 19 is a perspective view of a cover part according to Modification 3.

FIG. 19 is a diagram for describing cover part 4C according to Modification 3. As with the above-described cover part 4, cover part 4C includes first cover part 41, second cover part 42, and coupling part 43c.

In addition, cover part 4C includes arranging groove, part 46 provided in the outer surface of coupling part 43c. Groove part 46 extends in the front-rear direction. A part of wiring 21 is arranged in groove part 46. With groove part 46, cover part 4C can achieve positioning of wiring 21.

Method of Assembling Cover Part

When assembling the cover part 4, the worker elastically deforms second cover part 42. Then, the worker pushes downward the elastically deformed second cover part 42 from the upper end opening of second arrangement space 312.

In this manner, when elastically deformed, second cover part 42 of the present embodiment has a size that allows for passage through second arrangement space 312 from the upper side toward the lower side. When second cover part 42 comes out of second arrangement space 312 from the lower end opening of second arrangement space 312, second cover part 42 is returned to the original shape, and covers the lower end opening of second arrangement space 312 from below. Note that the method of assembling cover part 4A according to Modification 1 and cover part 4B according to Modification 2 is the same as the method of assembling cover part 4.

In the present embodiment, second cover part 42 is smaller than first cover part 41. With such a dimensional relationship, second cover part 42 can easily pass through second arrangement space 312. Thus, this dimensional relationship contributes to the improvement of the efficiency of the operation of assembling cover part 4 to second arrangement space 312.

In the above-mentioned manner, cover part 4 covers the upper opening and lower opening of second arrangement space 312. Thus, cover part 4 is effective for preventing entry of foreign matters into second arrangement space 312. In addition, wiring 21 arranged in second arrangement space 312 is covered with cover part 4, and is therefore not visually recognized from the outside. Thus, cover part 4 is effective also for the improvement of the design.

Note that coupling part 43 may be omitted. In addition, in the present embodiment, first cover part 41 and second cover part 4:2 are connected through coupling part 43 such that they cannot be separated. It should be noted that, first cover part 41 and second cover part 42 may be separated.

In addition, although not illustrated in the drawings, cover part may be integrated with hinge part 32. In other words, hinge part 32 may include a cover part that covers the upper opening and lower opening of second arrangement space 312. In addition, the cover part may be omitted.

Operation and Effect of Present Embodiment

According to the frame F and eyewear of the present embodiment with the above-described configuration, the frame and the eyewear that are comfortable to wear can be achieved.

Figure 13:
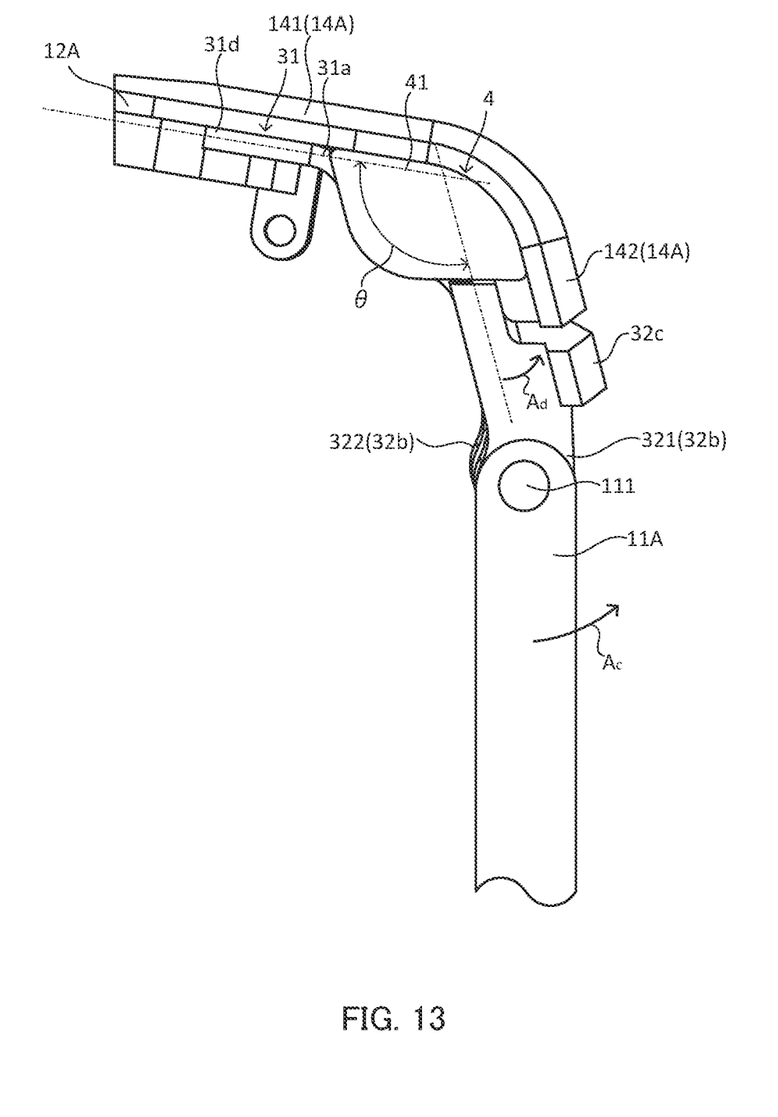
FIG. 13 is a diagram partially illustrating a connecting part and a temple.

Specifically, in the present embodiment, front 1 and temples 11A and 11B are connected through connecting part 3. When the user wears the eyewear, a force in the direction of arrow Ac of FIG. 13 is applied to temple 11A from the lateral head of the user. The direction of arrow Ac of FIG. 13 is the direction in which the distance between temples 11A and 11B increases.

Then, resilient part 31 of connecting part 3 elastically deforms from the natural state such that angle θ between fourth plate part 31g and first plate part 31d (see FIG. 16) increases, and fourth plate part 31g turns in the direction of arrow Ad of FIG. 13. In this state, a force corresponding to the restoration force (the force returning to the natural state) of resilient part 31 is applied to the lateral head of the user from temple 11A.

In the present embodiment, by adjusting the configuration of resilient part 31, the restoration force of resilient part 31 can be set to an appropriate value, and thus the frame and the eyewear that are comfortable to wear can be achieved.

This application is entitled to and claims the benefit of Japanese Patent Application No. 2019-147701 filed on Aug. 9, 2019, the disclosure each of which including the specification, drawings and abstract is incorporated herein by reference in its entirety.

INDUSTRIAL APPLICABILITY

The frame and the eyewear according to the present invention are not limited to electronic eyeglasses, and may be applicable to various eyewear.

REFERENCE SIGNS LIST

G Electronic eyeglasses
F Frame
1 Front
1a Bridge
1b Nose pad
1c Housing
11A,11B Temple
111 Pin
12A, 12B Rim
121 Rim side arrangement space
13A,13B Lens
13a First region
13b Second region
130 First substrate
131 Characteristic change part
131a Diffraction structure
131b First electrode
131c Liquid crystal module
131d Second electrode
132 Second substrate
14A, 14B End piece
141 First end piece
142 Second end piece
15 Operation input part
16 Power source
17 Control part
21 Wiring
3 Connecting part
31 Resilient part
31a First bending part
31b Second bending part
31c Third bending part
31d First plate part
31e Second plate part
31f Third plate part
31g Fourth plate part
311 First arrangement space
311a First opening
311b Second opening
312 Second arrangement space
313 Third arrangement space
313a First opening
313b Second opening
314 Groove part
32 Hinge part
32a First supporting part
32b Second supporting part
32c Exterior decorative part
321,322 Opposing plate part
321a, 321b Through hole
323 Groove part
4, 4A, 4B, 4C Cover part
41, 41a First cover part
42, 42a Second cover part
43, 43a, 43b, 43c Coupling part
44 Through hole
45 Through hole
46 Groove part

What is claimed is:

1. A frame, comprising:
   a front;
   a temple;
   a connecting part having elasticity and configured to connect the front and the temple, wherein the connecting part includes a resilient part having elasticity and fixed to the front, and a hinge part connected to the resilient part and connected to the temple; and
   a wiring configured to electrically connect a front electric element provided in the front and a temple electric element provided in the temple, wherein a part of the wiring is arranged in a space between the front and the connecting part.

2. The frame according to claim 1, further comprising a cover part configured to cover the space.

3. The frame according to claim 2, wherein the cover part includes a hollow part.

4. The frame according to claim 3, wherein the part of the wiring is arranged in the hollow part.

5. The frame according to claim 2, wherein the cover part is made of silicone rubber.

6. The frame according to claim 5, wherein the silicone rubber has a durometer hardness of A30 to A50.

7. The frame according to claim 1, wherein the resilient part includes:
   a first fixing part fixed to the front; and
   an elastic deformation part connected to the first fixing part and configured to elastically deform to change an angle to the first fixing part in accordance with a force applied to the temple.

8. The frame according to claim 1, wherein the resilient part includes a plurality of bending parts.

9. The frame according to claim 8, wherein the resilient part includes three bending parts.

10. The frame according to claim 1, wherein the space is provided between the resilient part and the front.

11. The frame according to claim 1, wherein the front is made of metal.

12. The frame according to claim 1, wherein the connecting part is made of metal or resin.

13. The frame according to claim 1,
    wherein the front is made of metal; and
    wherein the connecting part is made of metal.

14. The frame according to claim 1,
    wherein the front is made of resin; and
    wherein the connecting part is made of the resin.

15. Eyewear comprising:
    the frame according to claim 1; and
    a lens held at the front.

* * * * *